Oct. 25, 1966  E. TATOM  3,281,764
ACOUSTICAL DIRECTION AND RANGE FINDER FOR HELICOPTERS
Filed May 16, 1963
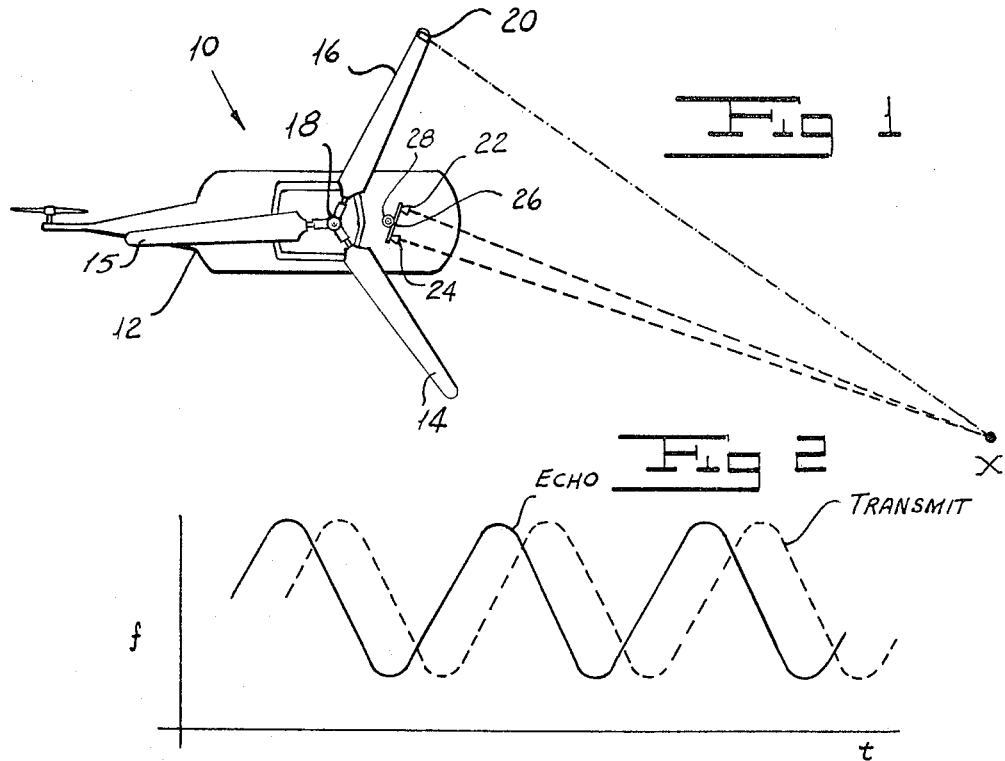
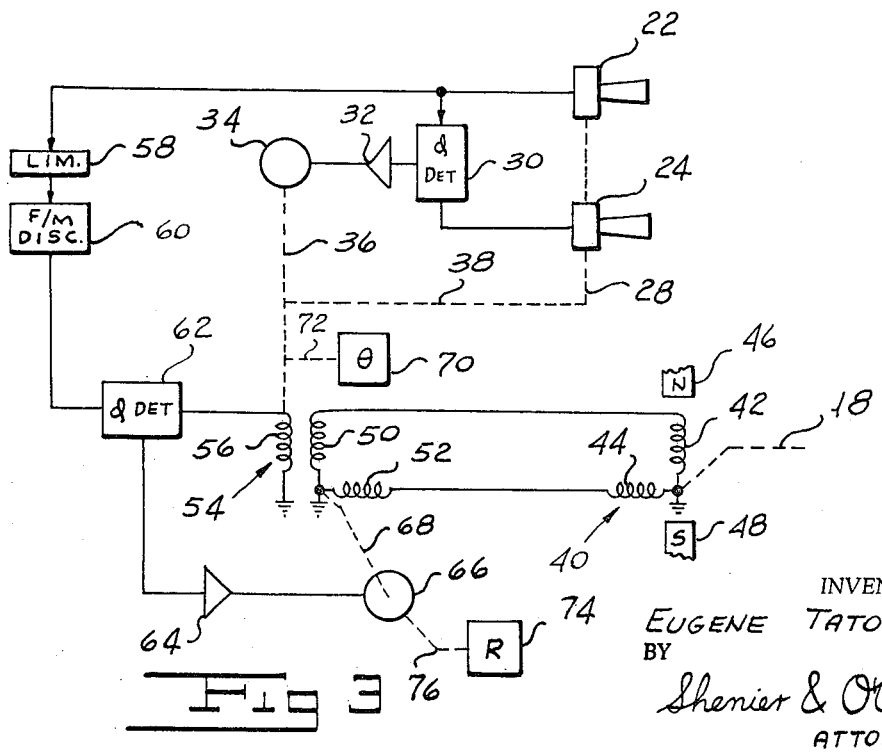
INVENTOR.
EUGENE TATOM
BY
Shenier & O'Connor
ATTORNEYS

United States Patent Office 3,281,764
Patented Oct. 25, 1966

3,281,764
ACOUSTICAL DIRECTION AND RANGE FINDER
FOR HELICOPTERS
Eugene Tatom, Fairfield, Conn., assignor to United Aircraft Corporation, East Hartford, Conn., a corporation of Delaware
Filed May 16, 1963, Ser. No. 280,899
6 Claims. (Cl. 340—1)

My invention relates to an acoustical direction and range finder and more particularly to a highly efficient acoustical direction and range finder for helicopters.

It is desirable for the pilot of a craft to be apprised at all times of objects in his vicinity. This is particularly true in the case of helicopters which often are employed for work relatively close to surrounding objects. There are known in the prior art various systems for determining the direction and range of objects from a craft. Generally speaking these systems are relatively complicated and expensive long-range installations.

It has been suggested in the prior art that an acoustical system be provided for generating vibrations of ultrasonic frequency which are reflected back to a vehicle or craft carrying the generator to locate the direction and range to a distant object. While systems of this type are known in the art, generally they are not as efficient as is desirable. Moreover they are affected by local noise so as to be relatively ineffective for locating close objects.

The advantages of a frequency modulated system are well known in the art. Frequency modulated systems discriminate against noise or unwanted signals. In this connection their most significant advantage in a transmit and receive system is that they are able to discriminate against the signal being transmitted to produce an echo.

For an acoustical system to operate satisfactorily the transmitted signal must be relatively powerful if it is to have an adequate range to be operative. In order to produce a sufficiently powerful signal a tuned transmitter can be employed. Since the horn of the transmitter is most efficient as an emitter at the particular frequency for which it is designed it is not generally possible to frequency modulate the signal and yet retain the high efficiency.

I have invented an acoustical direction and range finder which is especially adapted for use on a helicopter. My system operates on the frequency modulation principle while at the same time employing a high efficiency sound transmitter. My acoustical direction and range finder is particularly adapted to determine the location of close objects. It is relatively simple and inexpensive for the desirable result achieved thereby.

One object of my invention is to provide an acoustical direction and range finder which is especially adapted for use on a helicopter.

Another object of my invention is to provide an acoustical direction and range finder which is especially suitable for determining the location of close objects.

A further object of my invention is to provide an acoustical direction and range finder which operates on the FM principle while at the same time employing a highly efficient sound transmitter.

Still another object of my invention is to provide an acoustical direction and range finder which is relatively simple and inexpensive for the result achieved thereby.

Other and further objects will appear in the following description.

In general my invention contemplates the provision of an acoustical direction and range finder for helicopters in which supersonic vibrations emitted from a generator carried by a helicopter rotor blade are reflected from an adjacent object to a directional receiver. I detect the phase difference between the echo frequency versus time characteristic and the transmitted sound signal frequency versus time characteristic referred to the direction of the echo. The directional receiver provides a measure of echo direction while the phase difference is a measure of the distance to the object producing the echo.

In the accompanying drawings which form part of the instant specifications and which are to be read in conjunction therewith and in which like reference numerals are used to indicate like parts in the various views:

FIGURE 1 is a schematic view of a helicopter provided with an acoustical direction and range finder.

FIGURE 2 is a plot of echo frequency and of transmitted sound frequency each versus time.

FIGURE 3 is a schematic view of one form of electrical circuit which I may employ in my acoustical direction and range finder.

Referring now to the drawings, my system is adapted to be used on a helicopter indicated generally by the reference character 10 having a body 12 and a rotor with blades 14, 15 and 16. The blades 14, 15 and 16 are carried by a shaft 18 which is driven in a manner known to the art.

I mount an ultrasonic transducer 20 on the end of one of the blades 16. While the device 20 may be any device known to the art which is adapted to generate vibrational waves above the hearing range of the normal ear, preferably I employ a whistle which emits these vibrations as the rotor turns. Preferably I select the device 20 so as to be highly directional in character. Now as the rotor turns and the device 20 emits vibrations they travel along a line which I have indicated by the dot-dash line in FIGURE 1 to a target indicated by X adjacent the helicopter 10. These vibrations bounce back from the target X toward the helicopter as an echo. The vibrations emitted by the whistle 20 as the rotor turns produce the effect of an equivalent transmitter at the rotor shaft center which emits a frequency modulated signal, the phase angle of which varies through 360° depending on rotor angle. As will be apparent from the following description I use as a reference signal this frequency modulated signal with its phase determined by the direction of the echo and determine the phase difference between the reference signal and the echo as a measure of range.

I mount a pair of highly directional acoustic receivers 22 and 24 in spaced relationship on a support 26. The support 26 is carried by a shaft 28 which is adapted to be driven in a manner to be described hereinafter to orient the receivers 22 nad 24 to the direction from which the echo is coming. I have indicated the path of the echo by the broken lines in FIGURE 1.

From the structure thus far described it will readily be apparent that the vibrations received at the target X are modulated in pitch at the frequency of the rotor speed which is, for example, around 3 cycles per second. The echo picked up by the receivers 22 and 24 is distinguished from other noise by its average frequency which is the pitch of the device 20 plus the Doppler due to the motion of the craft 10. This echo is also distinguished by its modulation frequency which is determined by the rotor speed and by the amplitude of the frequency modulation which amplitude is proportional to the product of the pitch, the rotor speed and the rotor diameter.

Referring to FIGURE 2 I have illustrated the curve of echo frequency versus time by the solid line. There is also shown in this figure, by the broken line, a representation of the frequency versus time characteristic of the reference signal, the phase of which is determined by the direction to the object X. I have labeled this signal "transmit."

Referring now to FIGURE 3 I have shown one arrangement which can be employed to determine the direction and range of the target by use of the received echo. It will be apparent that the echoes received at the respective receivers 22 and 24 both are modulated at the same frequency. If the receivers are not oriented to the direction of the target X then there will exist some phase difference between echoes received at the devices 22 and 24. I apply the receiver outputs to a phase detector 30 of any suitable type known to the art for producing an output signal which is a measure of the phase difference between the two input signals. An amplifier 32 applies this phase difference signal to a servomotor 34 having a shaft 36. A suitable linkage indicated schematically in FIGURE 3 by the broken line 38 couples shaft 36 to the shaft 28. From the structure just described it will be clear that the signal fed to the motor 34 causes the shaft 36 to position shaft 28 through the medium of linkage 38 until the receivers 22 and 24 are oriented to the direction of the target X. It will readily be understood that when this has been achieved the phase detector 30 is at a null.

I obtain a measure of range to the target X in my system by measuring the phase difference between a signal representing frequency versus time characteristic of the frequency modulated signal at X, the phase of which is determined by echo direction and the echo frequency versus time signal. This is indicated by the plot of FIGURE 2 in which the phase difference between the solid line curve and the broken line curve is a measure of distance to the target X.

I couple the shaft 18 of the rotor to an alternating current signal generator indicated generally by the curve character 40. The generator 40 comprises a pair of rotor windings 42 and 44 positioned in the field produced by a pair of magnet poles 46 and 48. As the shaft 18 rotates, a signal having a frequency determined by the rotor speed is generated at the windings 42 and 44. I connect windings 42 and 44 to the respective primary windings 50 and 52 of a resolver indicated generally by the reference character 54. The secondary winding 56 of resolver 54 is adapted to be positioned by the shaft 36 of the servomotor 34. Owing to this arrangement it will readily be apparent that winding 56 carries a signal having a frequency which is determined by the speed of shaft 18 and which is shifted in phase by an amount proportional to the angular position of shaft 36 which is a measure of the direction of the target X. Thus this signal represents the signal produced by the equivalent transmitter described above. The signal carried by winding 56 is represented by the broken line curve of FIGURE 2.

I apply an output signal of one of the receivers such, for example, as the receiver 22 to a limiter 58 which couples the signal to a frequency modulation discriminator 60 which produces an output signal representing the variation of frequency of the echo with time. Thus discriminator 60 produces an output signal which is represented by the solid curve shown in FIGURE 2.

I apply the respective signals from winding 56 and from discriminator 60 to a suitable phase detector 62 which, as is known in the art, produces an output signal representing the phase difference between the two input signals. An amplifier 64 couples this signal to a servomotor 66 having a shaft 68. I couple shaft 68 to the primary windings 50 and 52 of resolver 54 to return the resolver to a null. It will readily be appreciated that with the resolver 54 nulled the angular position of shaft 68 is a measure of range.

I couple shaft 36 to a signal generator 70 by a linkage 72 so that the output of the generator represents the angular position of the target. Similarly, I couple shaft 68 to a signal generator 74 by a linkage 76 so that the generator 74 produces an output signal representing the range to the target. It will readily be understood that the output signals 70 and 74 can be used in any desired manner. For example, they may be employed to provide a visible representation of the position of target X relative to the craft in any suitable manner known to the art. Alternatively they could, if desired, be used to actuate an automatic control system.

In use of my acoustical direction and range finder as the rotor of helicopter 10 turns, the generator 20 emits vibrations at an ultrasonic frequency. At the target X these vibrations are received with a modulation frequency determined by rotor speed. Thus the echoes from the target which are picked up by the receivers 22 and 24 have the same modulation frequency. If the two receivers are not correctly oriented to the direction of the target, detector 30 produces an output signal proportional to the difference in phase between the echoes picked up by the two receivers. This signal energizes motor 34 to drive shaft 36 until shaft 28 has been so positioned that the receivers are pointed toward the target X. When this occurs the signal output from generator 70 is a measure of the relative position of the target. At the same time the secondary winding 56 of resolver 54 produces an output signal which is a measure of the frequency versus time characteristic of the transmitted signal with its phase referred to the echo direction. This signal is compared with the echo frequency versus time signal from discriminator 60 to energize servomotor 66 until the generator 74 produces a signal representing the target range. It will readily be understood that where there are a plurality of objects close to the helicopter a suitable representation such, for example, as a P.P.I. representation of the targets or objects can be produced.

It will be seen that I have accomplished the objects of my invention. I have provided an acoustical direction and range finder for helicopters. My acoustical direction and range finder operates on the frequency modulation principle. It is highly efficient and is not appreciably affected by noise. It is simple in construction for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A direction and range finder for a craft having a rotor including in combination a generator on said craft for producing a signal modulated in frequency at a rate proportional to the speed of said rotor, said signal being adapted to produce an echo in response to an object adjacent said craft, means responsive to said echo for determining the direction thereof, means for producing an echo signal representing the frequency versus time characteristic of said echo, means responsive to said rotor for generating a reference signal, means for shifting the phase of said reference signal in accordance with the direction of said echo and means for determining the phase difference between said echo signal and said phase-shifted reference signal as a measure of range.

2. A direction and range finder for a craft having a rotor provided with a blade including in combination a sound generator, means mounting said generator on said blade to cause said generator to emit sound in response to rotation of said rotor, said sound being adapted to produce an echo in response to an object adjacent said craft, a directional receiver responsive to said echo for determining the direction thereof, means responsive to said rotor for generating a reference signal, means responsive to said directional receiver for shifting the phase of said reference signal to refer said reference signal to the direction of said echo, means for producing an echo signal representing the frequency versus time characteristic of said echo and means for determining the phase difference between said reference signal and the echo signal as a measure of range.

3. A direction and range finder for a craft having a rotor with an axis and a blade extending outwardly of said axis including in combination a sound generator, means mounting said generator on said blade at a location spaced from said axis to cause the generator to emit sound, said sound being adapted to produce an echo in response to an object adjacent said craft, means responsive to said echo for determining the direction thereof, means responsive to said rotor for producing a reference signal, means for shifting the phase of said reference signal in accordance with the direction of said echo and means for determining the phase difference between the phase-shifted reference signal and the frequency versus time characteristic of said echo.

4. A system for determining the range and direction of an object from a craft including in combination, a support, means for rotating said support around an axis, a transmitter emitting a signal unmodulated in frequency, means mounting said transmitter on said support at a location spaced from said axis, said signal producing a reflected signal in response to said object, means providing a reference signal as a function of the rotation of said support, means for phase shifting said reference signal in accordance with the azimuthal direction of said object and means for determining the phase angle between said phase shifted reference signal and the frequency versus time characteristic of said reflected signal.

5. A system as in claim 4 in which said phase shifting means comprises automatic direction finding means responsive to said reflected signal for determining the azimuth angle of said object.

6. A system as in claim 5 in which said transmitter is an acoustic generator.

References Cited by the Examiner
UNITED STATES PATENTS 2,701,875   2/1955   Baltzer.
3,144,646   8/1964   Breithaupt.

BENJAMIN A. BORCHELT, *Primary Examiner.*

M. F. HUBLER, *Assistant Examiner.*